(No Model.) 2 Sheets—Sheet 2.
I. F. GOOD.
AIR COOLING AND PURIFYING APPARATUS.
No. 469,207. Patented Feb. 16, 1892.
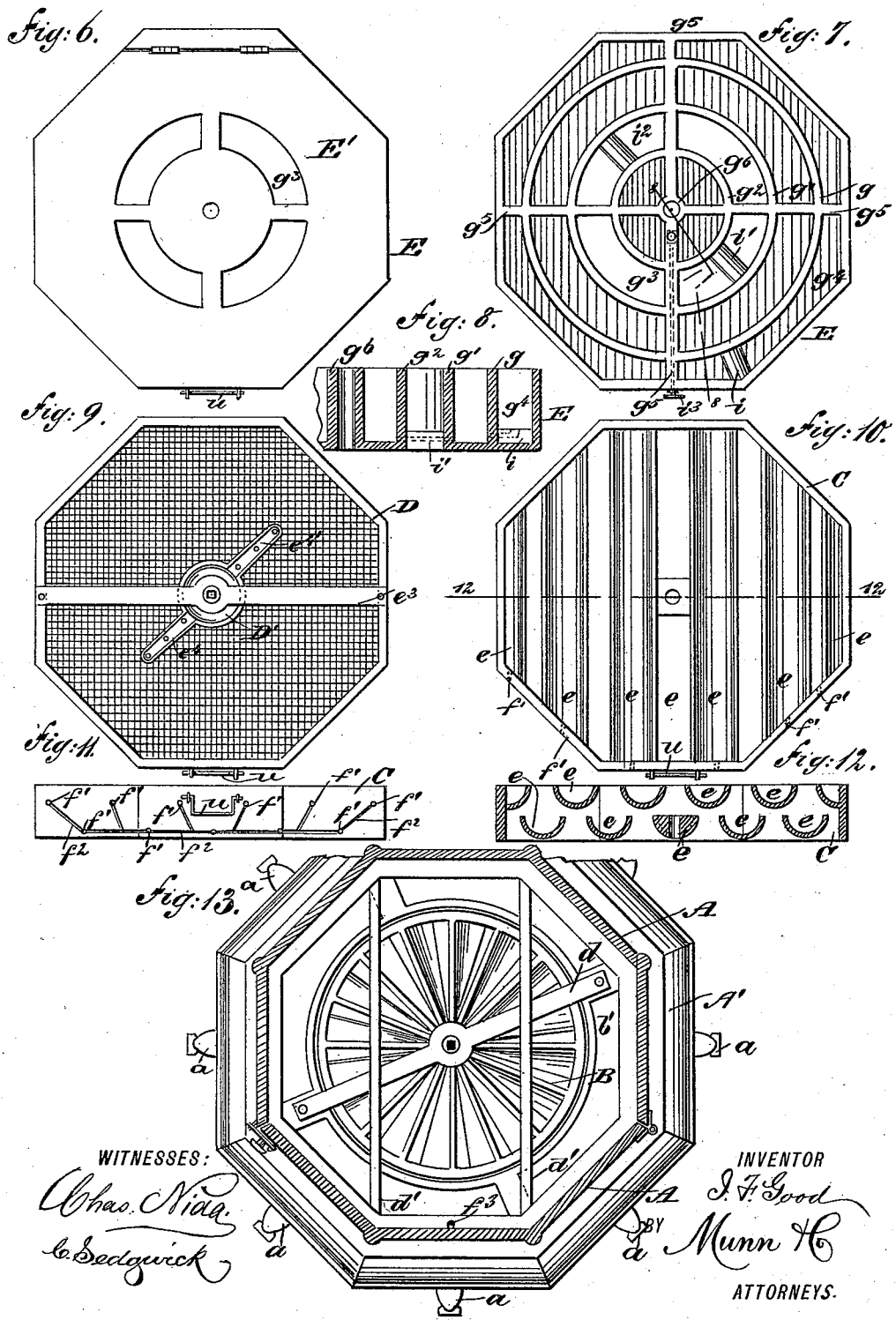
WITNESSES:
Chas. Nida
C. Sedgwick
INVENTOR
I. F. Good
BY Munn & Co.
ATTORNEYS.

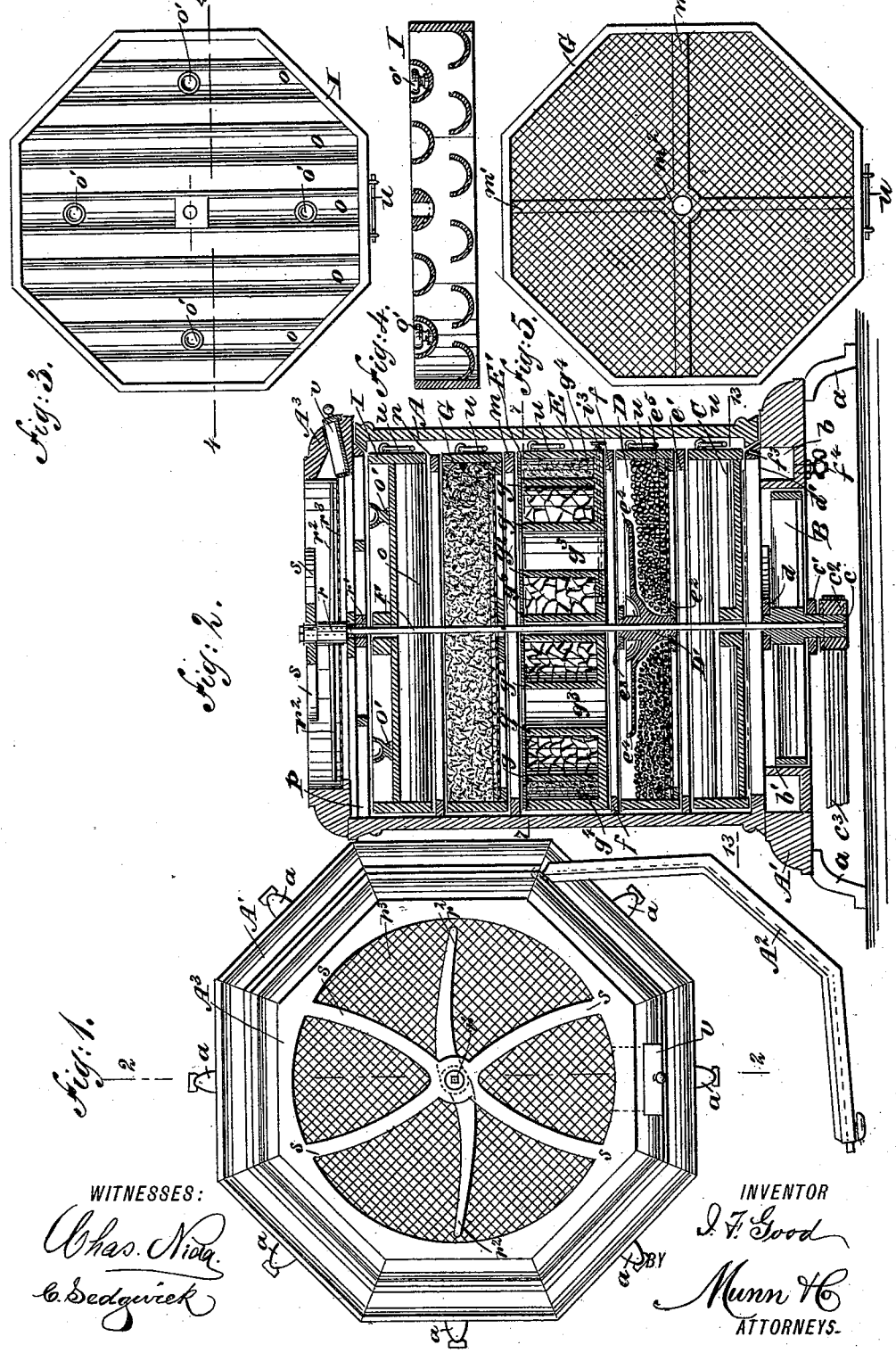

UNITED STATES PATENT OFFICE.

ISRAEL F. GOOD, OF ALLENTOWN, PENNSYLVANIA.

AIR COOLING AND PURIFYING APPARATUS.

SPECIFICATION forming part of Letters Patent No. 469,207, dated February 16, 1892.

Application filed August 20, 1891. Serial No. 403,155. (No model.)

*To all whom it may concern:*

Be it known that I, ISRAEL F. GOOD, of Allentown, in the county of Lehigh and State of Pennsylvania, have invented a new and useful Air Cooling and Purifying Apparatus, of which the following is a full, clear, and exact description.

This invention relates to an improved device for purifying and cooling air in apartments; and it consists in the construction and combination of parts, as is hereinafter described and claimed.

Reference is to be had to the accompanying drawings, forming a part of this specification, in which similar letters of reference indicate corresponding parts in all the figures.

Figure 1 is a plan view of the device. Fig. 2 is a vertical axial section taken on the line 2 2 in Fig. 1. Fig. 3 is a top view of a removable tray, which is the uppermost one of a series of trays that are essential parts of the apparatus. Fig. 4 is a cross-section of the tray shown in Fig. 3, taken on the line 4 4 in said figure. Fig. 5 is a top view of a tray located below the receptacle shown in Fig. 3. Fig. 6 is a plan view of a tray removably located immediately below the one shown in Fig. 5. Fig. 7 is a sectional plan of the part shown in the previous figure, taken on the line 7 7 in Fig. 2. Fig. 8 is a broken transverse section of the tray shown in Fig. 7, taken on the line 8 8 in said figure. Fig. 9 is a plan view of a tray and an attachment supported on it, located immediately below the tray shown in Fig. 7. Fig. 10 is a top view of a drawer or tray located below the parts shown in Fig. 9. Fig. 11 is a front face view of the tray shown in Fig. 10. Fig. 12 is a cross-section of the tray shown in Fig. 10 on the line 12 12 in said figure, and Fig. 13 is a sectional plan taken on the line 13 13 in Fig. 2.

In the drawings, A represents a casing wherein the trays and other movable parts of the device are located when in service, said casing consisting of a vertical shell, preferably made octagonal, but which may have a cylindrical or other shape, a suitable base A' being provided therefor, which rests upon legs $a$, that are of proper height to permit freedom of movement for working parts below the base.

There is a door $A^2$ provided for the casing A, which is of a proper width to admit the free insertion of parts within the casing that nearly equal in width its interior diameter, the height of said door being equal to that of the casing-walls from the base A' to the cap-piece $A^3$.

Within the base A' an annular cavity $b$ is formed, the outer wall of which is inclosed by the superimposed casing A above it, the inner wall $b'$ of said cavity, which is circular, forming the boundary of an aperture in the base, wherein a radially-bladed fan-wheel B is centrally supported free to revolve by a journaled engagement of its hub-extension $c$ with a transverse supporting-bar $c'$, that is affixed to the lower wall of the base. Said bar is centrally perforated to receive the hub-extension $c$, that projects below the bar far enough to receive a pulley $c^2$, as shown in Fig. 2, which pulley is thereto secured and affords means for the rotation of the fan-wheel B and other parts which will be described in their order. Above the fan-wheel B another transverse supporting-bar $d$ is affixed by its ends upon the top of the circular wall $b'$, which bar is loosely engaged by an upwardly-projecting journal end of the fan-wheel hub, whereby said wheel is rotatably supported in a horizontal plane. Above the cross-bar $d$ two parallel supporting-strips $d'$ are secured by their ends to the inner side of the casing-wall, and upon said strips a tray C is seated when fully inserted within the casing A.

The tray C is substantially the same in form peripherally as is the casing's interior, so as to loosely engage its wall when in place. Said tray, which is shown in Figs. 10 and 12, has a double series of transverse troughs $e$, arranged to occupy the space encompassed by its octagonal side wall having their open sides above, so as to permit the insertion and retention of tan-bark or a similar odoriferous material.

Above the tray C on two cross-bars $e'$ a sliding tray D is located, which has a reticulated bottom and a stiffening cross-bar $e^2$, secured centrally, there being a similar cross-bar $e^3$ affixed by its ends to the side walls of the tray above and in alignment with the bar $e^2$, said bars having central perforations. Within the perforations of the cross-bars $e^2$ $e^3$ journal ends of a rotatable water-sprinkler D' are loosely inserted, which latter consists of a central hub, from which the journal ends project in a vertical plane, the upper side of the hub having a circular cup formed in it, from which extend two opposite arms $e^4$, that are longitudinally channeled on their upper surface, so as to receive water from the cupped hub. Said arms have perforations made at intervals in their walls to deliver water therefrom upon a body of gravel or cobble-stones $e^5$, that are deposited of a proper depth in the tray D below the arms $e^4$.

A short distance above the tray D two parallel supporting cross-bars $f$ are secured by their ends to the vertical wall of the casing A, which sustain the tray E free to slide thereon.

As shown in Figs. 7 and 8, the tray E is provided with three concentric and equally separated circular walls $g$ $g'$ $g^2$, that are located within the outer octagonal wall of the tray, the outer circular wall $g$ being of such a proportionate diameter as will afford a space $g^4$ between it and the octagonal wall, which space is preferably filled with a non-conductor of heat, such as cotton or like substance. There is a water-tight bottom provided for the space bounded by the inner circular wall $g^2$, and also for the chambers produced by the outer octagonal wall and two concentric walls $g$ $g'$, there being an annular passage $g^3$ afforded between the walls $g^2$ and $g'$ for the transmission of air-currents through, preferably from above. The circular walls $g$ $g'$ $g^2$ are held spaced apart by radial walls $g^5$, that join a central hub $g^6$, which is vertically perforated to receive an upright shaft F, which shaft also penetrates the centrally-perforated hub of the water-sprinkler D' and the center trough $e$ of the tray C, and thence passes through the hub of the fan-wheel B, said shaft being secured by any suitable means to the sprinkler D' and fan-wheel, and also to another piece above these parts, as will appear.

Within the annular chambers formed by the circular wall $g^2$ and concentric walls $g$ $g'$ a refrigerant—such as ice—is placed, which will cool the air passing through the open space $g^3$ between the walls $g'$ $g^2$.

Upon the tray E a lid E' is placed, which is hinged at one edge, so as to permit its elevation when the tray is removed from the casing A, there being a corresponding annular slot cut in the lid to mate the air-passage $g^3$, and thus allow air to circulate through the tray, while it is sealed above the ice-holding chambers.

At $i$ $i'$ $i^2$ tubular passages are formed between the outer space $g^4$ and adjacent ice-chamber, and also between the central ice-chamber and the encircling ice-chamber, so that all condensed water formed in the surrounding chambers will be delivered into the central ice-chamber, and from it thence through a valve in its bottom upon the water-sprinkler D', the escape of water being controlled by a valve-rod, which extends outwardly and terminates in a handle or knob $i^3$.

Referring to Fig. 11, where the front face of the tray C is shown, a series of perforations $f'$ appear, which penetrate the side wall of the tray and intersect the several troughs $e$ therein at their front ends. Said perforations are connected together by small channels $f^2$ and are adapted to discharge any drippings that fall into the troughs through a hole at $f^3$ in the base A' into the cavity $b$, from which it may be drawn by opening the cock $f^4$.

Upon the cross-bars $m$, that are affixed to the wall of the casing A above and near to the tray E, the tray G is supported, which tray is similar in form to the tray D below, and likewise is provided with a reticulated bottom, which tray is preferably filled with charcoal, as represented in Fig. 2. The screen cloth bottom has its lower surface in contact with two cross-bars $m'$, that intersect each other at right angles, there being a perforated hub $m^2$ formed at the center, where said bars cross each other.

A horizontal supporting-frame $n$ is secured to the wall of the casing next and directly above the tray G, whereon a tray I is placed removably. Said tray (shown in Figs. 2, 3, and 4) has two series of troughs $o$, extended across the tray side wall and connected by their ends to the inner side of said wall, the troughs being intended to receive lime in a powdered condition, slaked or otherwise, and in some of the troughs cups $o'$ are located, in which carbolic acid or other disinfectant is placed.

The cap-piece $A^3$ of the casing A is in ring form and is seated upon the casing, as is indicated in Fig. 2, there being a frame $p$ attached horizontally within and upon the top of the casing-wall and close to the tray I, upon which the cap-piece also bears. The frame $p$ is in skeleton form and is provided with a central hub that is vertically perforated for the reception of a depending journal $r'$, formed on a hub $r$, which is also journaled at its upper end in a light frame $s$, that is attached to the cap-piece $A^3$ by its extremities. The hub $r$ is provided with opposite radial arms $r^2$, that lie in a horizontal plane directly above a screen wire-cloth diaphragm $r^3$, through which the hub $r$ passes. The hub $r$ and tray I are each centrally perforated, and the shaft F passes through them, the hub being secured thereto, so as to receive rotary motion.

At a proper point the cap-piece $A^3$ is apertured for the reception of a small drawer $v$, which has the top edge of its rear or inner wall in the same plane or slightly below the top surface of the diaphragm $r^3$, and is thus adapted to receive flies or other insects that may be drawn into the upper portion of the apparatus, the rotation of the arms $r^2$ sweeping the insects into the drawer by centrifugal force.

The dimensions of the casing A and contained parts may be varied to suit the area to be cooled.

In service the shaft F is rotated by motion transmitted to the pulley $c^2$ through a belt $c^3$. (Shown broken in Fig. 2.) The revoluble movement of the shaft F causes the fan-wheel B to draw air from above downwardly through the machine. The current of vitiated air received from the upper part of the room will first have contact with the lime in tray I. Thence it will filter through the bed of charcoal in tray G, which will aid in its purification. Below the charcoal the air passes through the annular passage in the tray E, which will cool it measurably, the completion of the cooling operation being effected by the transmission of the air through the bed of gravel in tray D, which is copiously wetted by means of the sprinkler D'. After the current of air has traversed the gravel-bed in tray D it is brought into contact with the aromatic bark or like substance in tray C, and thence it is drawn through the fan-wheel and discharged at the base of the apparatus, the movement of the wheel causing a lateral distribution of the cooled and purified air in an obvious manner.

When the trays are to be removed from the casing A to change or renew their contents, this can be effected by first withdrawing the shaft F and then opening the door $A^2$, which will permit any or all of the trays to be pulled out by handles $u$, that are secured to their front faces, as shown in Fig. 2.

If preferred, the fan-wheel B may be caused to receive air below and project a current upwardly through the apparatus; but as constructed greater efficiency will be secured by drawing hot and impure air from above, as has been described.

Having thus described my invention, what I claim as new, and desire to secure by Letters Patent, is—

1. An air cooler and purifier comprising the vertical casing having a door in one side, a central vertical shaft provided with a horizontal fan-wheel, and a series of removable trays within the casing, all constructed for the passage of air through them, and one of the trays having a series of troughs provided with cups $o'$, substantially as set forth.

2. In an air cooler and purifier, the combination, with the casing, the rotary fan-wheel to force air therethrough, and the ice-receptacle, of the rotary sprinkler between the wheel and ice-receptacle and receiving the drip from the latter, substantially as set forth.

3. The combination, with an upright casing provided with a screen at its upper end, of a vertical shaft rotatable centrally in the casing, a fly-beater at the upper end of said shaft, an inclined drawer at one side of said beater, a fan-wheel in the lower end of the casing and fitted on said shaft, and a driving-pulley on said fan-wheel, substantially as described.

4. The combination, with an upright casing provided with a door, a horizontal fan-wheel in the base of the casing, and a driving-pulley on said fan-wheel, of a vertical shaft centrally located in said casing, a series of removable trays fitted one upon the other in the casing, one tray having an ice-receptacle provided with a drip-outlet, and a water-sprinkling device fitted on and rotated by the vertical shaft in the casing and receiving the discharge from said drip-outlet, substantially as described.

5. The combination, with an upright casing provided with a door, a vertical shaft rotatable centrally in the casing, and a fan-wheel at the lower end of said shaft having a driving-pulley thereon, of a removable tray above the fan-wheel formed with transverse troughs and containing an aromatic substance, a removable tray above the first-named tray having a reticulated bottom and containing gravel, a rotatable water-sprinkler in said tray, a removable tray above the water-sprinkler and containing ice and apertured for the passage of air therethrough, a valve controlling the discharge of water from said tray to the sprinkler, a removable tray supported above the ice-holding tray and containing charcoal, and a removable tray above the charcoal-holding tray and containing lime, substantially as described.

ISRAEL F. GOOD.

Witnesses:
JAMES HAUSMAN,
G. W. SEAGRAVES.